United States Patent
Misciagna

(10) Patent No.: US 9,102,104 B2
(45) Date of Patent: Aug. 11, 2015

(54) METHOD FOR REDUCING POROSITIES IN COMPOSITE RESIN PARTS

(75) Inventor: David Thomas Misciagna, West Chester, PA (US)

(73) Assignee: THE BOEING COMPANY, Chicago, IL (US)

( * ) Notice: Subject to any disclaimer, the term of this patent is extended or adjusted under 35 U.S.C. 154(b) by 411 days.

(21) Appl. No.: 13/488,768

(22) Filed: Jun. 5, 2012

(65) Prior Publication Data
US 2014/0202630 A1 Jul. 24, 2014

(51) Int. Cl.
*B29C 65/00* (2006.01)
*B32B 37/00* (2006.01)
*B32B 38/04* (2006.01)
*B27G 11/02* (2006.01)
*B29C 65/02* (2006.01)
*B31F 5/04* (2006.01)
*H05B 7/00* (2006.01)
*B29C 70/34* (2006.01)
*B29C 70/44* (2006.01)
*B29C 37/00* (2006.01)
*B29C 35/02* (2006.01)

(52) U.S. Cl.
CPC .............. *B29C 70/34* (2013.01); *B29C 37/0064* (2013.01); *B29C 70/44* (2013.01); *B29C 35/02* (2013.01); *Y10T 156/10* (2015.01)

(58) Field of Classification Search
CPC ...... B29C 65/00; B29C 65/02; B29C 65/008; B29C 65/7852; B29C 66/00145; B29C 63/0043; B32B 37/00; B32B 37/10; B32B 38/0008; B31F 5/04; H05B 7/00

USPC ............. 156/285, 286, 382, 272.2, 273.1, 87, 156/379.6, 379.7; 264/484
See application file for complete search history.

(56) References Cited

U.S. PATENT DOCUMENTS 6,017,484 A 1/2000 Hale
7,585,549 B2 9/2009 Lewis et al.

FOREIGN PATENT DOCUMENTS

DE 2336487 2/1975
WO WO2012048228 A1 4/2012

OTHER PUBLICATIONS

Extended European Search Report, dated Mar. 20, 2014, regarding Application No. EP13169064.6, 4 pages.
EP search report dated Sep. 19, 2013 regarding application 13169064.6-1303, reference 1282P568EP CG, applicant The Boeing Company, 5 pages.
Jones, "Triboelectric Charging of Common Objects," University of Rochester, Feb. 2012, 2 Pages, accessed Jun. 4, 2012, http://www.ece.rochester.edu/~jones/demos/charging.html.
Gubbels et al., "Electrostatic tool wear in diamond turning of amorphous polymers," Proceedings of the 4th euspen International Conference, May 2004, 2 Pages.

*Primary Examiner* — Richard Crispino
*Assistant Examiner* — Matthew Hoover
(74) *Attorney, Agent, or Firm* — Yee & Associates, P.C.

(57) ABSTRACT

An electrical charge is placed on a tool used to cure a composite resin part layup. The charged tool produces an electrostatic force that attracts entrapped gases in the resin to the surface of the tool, thereby reducing porosities in the cured part.

15 Claims, 5 Drawing Sheets

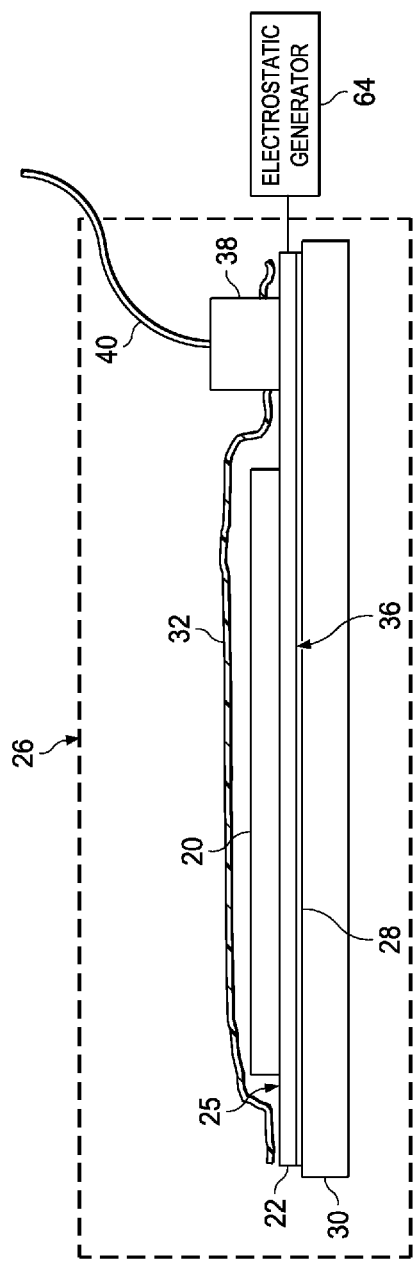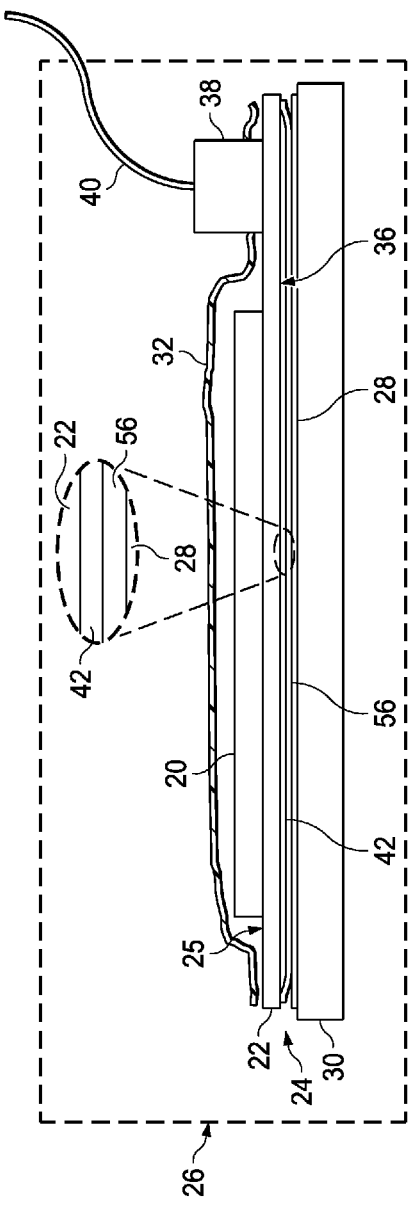

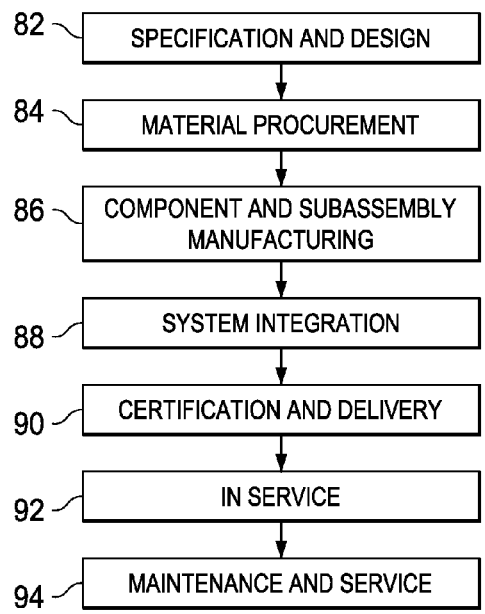
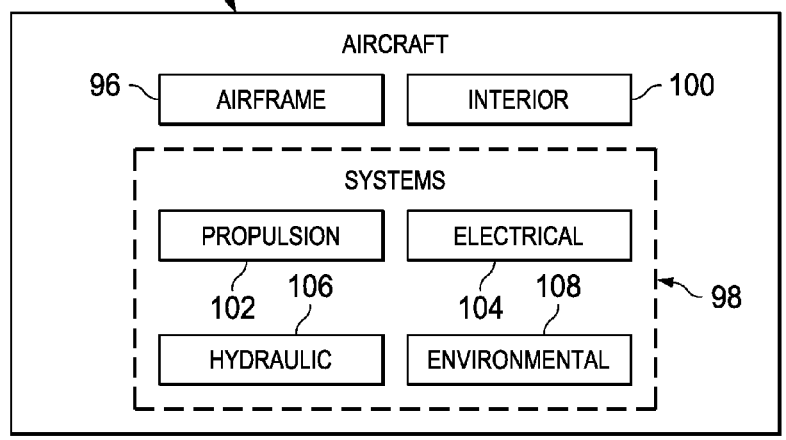

METHOD FOR REDUCING POROSITIES IN COMPOSITE RESIN PARTS

STATEMENT REGARDING FEDERALLY SPONSORED RESEARCH OR DEVELOPMENT

This invention was made with Government support under contract number W31P4Q-09-D-0029, awarded by the United States Army. The Government has certain rights in this invention.

BACKGROUND INFORMATION

1. Field

The present disclosure generally relates to the fabrication of composite resin parts, and deals more particularly with a method and apparatus for reducing porosities in the parts.

2. Background

Composite resin parts may be fabricated by laying up multiple plies of fiber reinforced resin in the form of prepreg. The prepreg part layup is cured by placing it on a tool and subjecting it to a combination of heat and pressure. As the part layup is heated, the prepreg plies soften and flow to form a consolidated structure, however air and/or volatile gases may be entrapped within the plies during the curing process that result in porosities in the cured part. These porosities are undesirable because they may reduce the performance of the part. Entrapped air and/or gases near the tool side of the part layup are particularly problematic and difficult to remove in some applications. One solution to the problem of tool-side part porosity involves curing the part layup in an autoclave where high pressures are applied to the part that may force out entrapped air and/or gases. Autoclave curing of composite part layups is time consuming, labor intensive and requires large, relatively expensive capital equipment. Another solution to the problem focuses on allowing the part layup to breathe through outer skins of the layup using bagging techniques that employ embedded breathing materials such as glass or polyscrim materials. The extensive use of breathing materials, including embedded breathing materials when used in oven curing is also time consuming and labor intensive, and may not be completely effective in eliminating part porosities, particularly those occurring near the tool-side of the part.

Accordingly, there is a need for a method and apparatus for curing composite resin part layups that substantially reduces or eliminates tool-side part porosities. Further, there is a need for a method and apparatus as mentioned above which allows out-of-autoclave processing of a composite resin part layup using conventional vacuum bagging techniques and curing within a conventional oven.

SUMMARY

The disclosed embodiments provide a method and apparatus for out-of-autoclave curing of composite resin part layups that may be carried out using conventional ovens, and which is effective in reducing or eliminating tool-side part porosities. Tool-side part porosities are reduced by placing a charge on a cure tool using an electric charge generator, such as, without limitation, an electrostatic charge generator. The reduction of tool-side porosities may enable parts to be cured using out-of autoclave processes.

In one embodiment, the electrical charge generator is used to negatively charge the tool, causing a negative charge to be placed on the tool surface engaging the part layup. The part layup carries a positive charge. The negative charge on the tool surface forms a charge imbalance or potential difference between the cure tool and the positively charged part layup, and this potential difference results in an electrostatic attractive force. As the part layup is heated during the cure process, the resin becomes less viscous and begins to flow, allowing any entrapped gas molecules to migrate. The electrostatic force attracts molecules of both the entrapped gasses and the resin toward the tool surface, thereby substantially reducing or eliminating part porosities, especially tool-side porosities.

The negative charge may be placed on the tool using a mechanical technique such as without limitation, triboelectric charging. The triboelectric charging is achieved by placing two materials on the backside of the tool that are sufficiently far apart on the triboelectric series to produce the necessary potential difference between the uncured composite part layup and the tool surface. In other embodiments, the negative charge may be placed on the tool using a dynamically powered system, such as a Van der Graaff generator.

According to one disclosed embodiment, a method is provided of reducing porosities in a composite resin part. The method comprises placing an uncured composite part layup on a surface of a tool and placing an electrical charge on the tool by electrically charging the tool. The method further comprises using the electrical charge on the tool to attract molecules within the uncured composite part layup to the surface of the tool, and curing the composite part layup. The electrical charging of the tool may be performed using triboelectric charging or a Van der Graaff generator. Charging is performed by placing a negative charge on the tool, which is used to attract molecules of gasses in the composite part layup toward the tool surface.

According to another embodiment, a method is provided of fabricating a composite part, comprising placing an uncured composite resin part layup on a surface of a tool and sealing a vacuum bag over the composite part layup. The method further comprises drawing a vacuum in the bag, heating the composite part layup, and placing an electric charge on the tool to attract gas molecules within the composite resin part layup towards the surface of the tool. The method also includes curing the composite part layup. The curing process may be carried out within an oven. Placing the electric charge in the tool may be performed by triboelectrical charging of the tool.

According to still another embodiment, a method is provided of reducing tool-side porosities in a composite resin part layup while being cured on the surface of the tool. The method comprises using an electric charge to attract gas molecules in a composite resin part layup to the tool surface.

According to still another embodiment, apparatus is provided for curing a composite resin part, comprising a tool having a tool surface adapted to engage a composite resin part layup, and an electrical charge generator for generating a charge on the tool surface sufficient magnitude to attract gas molecules in the composite resin part layup to the tool surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is an illustration of a side view of another embodiment of the apparatus.

FIG. 5 is an illustration of a side view of a further embodiment of the apparatus.

FIG. 7 is an illustration of a flow diagram of aircraft production and service methodology.

FIG. 8 is an illustration of a block diagram of an aircraft.

DETAILED DESCRIPTION

Figure 1:
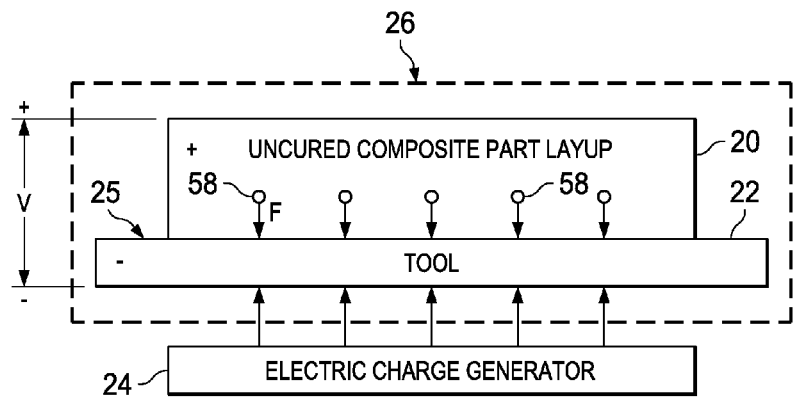
FIG. 1 is an illustration of a functional block diagram of apparatus for curing a composite resin part layup that reduces part porosities.

FIG. 1 broadly illustrates the components of apparatus for curing a composite resin part layup that reduces part porosities due to entrapped gases. The reduction in part porosities, particularly tool-side porosities, may enable the use of out-of-autoclave processes to cure composite part layups. An uncured composite part layup 20 is placed on the surface 25 of a suitable tool 22, sometimes referred to as a cure tool or a bond tool. As will be discussed in more detail below, a vacuum bag (not shown in FIG. 1) may be placed over the part layup 20 and sealed to the tool surface 25 in order to apply compaction pressure to the part layup 20 during the cure process. The part layup 20 placed on the tool 22 may be cured in a conventional oven indicated by the broken line 26. In order to reduce part porosities, particularly part porosities near the tool surface 25, an electric charge generator 24 is used to place a negative charge − on the tool 22 which may be maintained throughout the cure cycle. The uncured composite part layup 20 carries a positive charge +. The potential difference V resulting from the positively charged part layup 20 and the negatively charged tool 22 produces an electrostatic force F that attracts entrapped air and/or volatile gas molecules 58 (hereinafter collectively referred to as gas, gasses or gas molecules) to the surface 25 of the tool 22. As a result of the migration of the gas molecules 58 to the tool surface 25, porosities in the cured part layup 20 caused by entrapped gasses are substantially reduced or eliminated.

Figure 3:
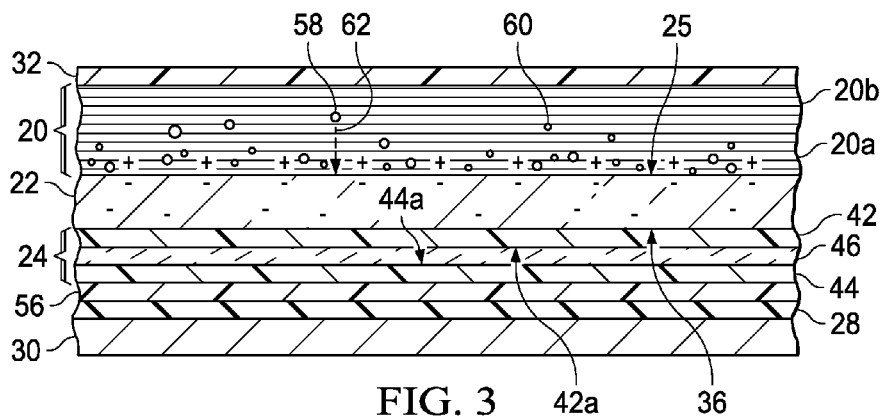
FIG. 3 is an illustration of an unexploded sectional view taken along the line 3-3 in FIG. 2.
Figure 2:
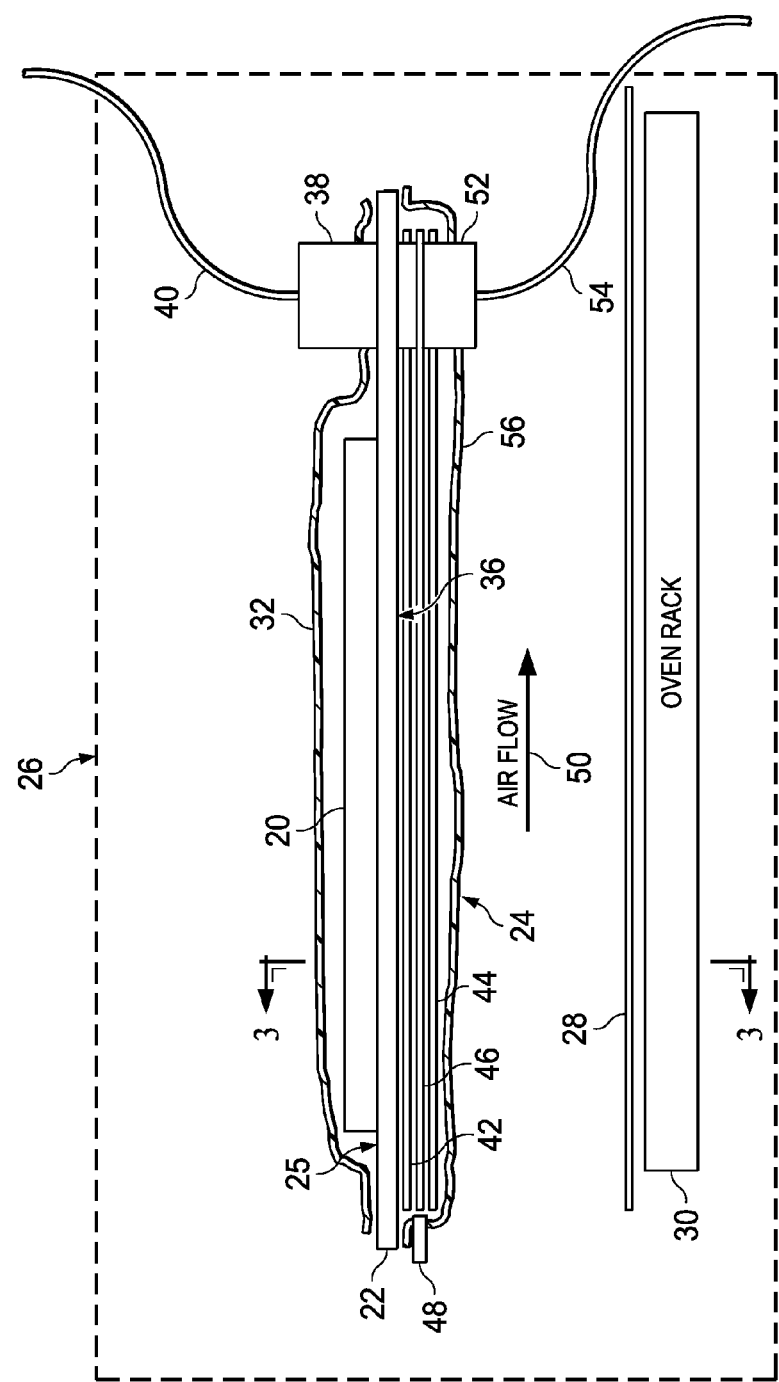
FIG. 2 is an illustration of an exploded side view of one embodiment of the apparatus shown in FIG. 1.

Attention is now directed to FIGS. 2 and 3 which illustrate one embodiment of the apparatus shown in FIG. 1 that may be employed to cure a composite resin part layup 20 within conventional oven 26 using conventional vacuum bagging techniques to apply compaction pressure to the part layup 20 during the cure process. The uncured composite part layup 20 may comprise multiple plies of a prepreg, each including a fiber reinforcement 20a (FIG. 3) held in a polymer resin matrix 20b. The uncured composite part layup 20 is placed on surface 25 of a tool 22. In the illustrated embodiment, the tool surface 25 is shown as being substantially flat, however in other applications the tool surface 25 may have one or more contours or curves or a combination of flat areas and contours (not shown). The tool 22 may comprise metal, a composite or other materials capable of maintaining an electric charge that is produced by an electric charge generator 24, which in this example is an unpowered, mechanical form of the electric charge generator 24 shown in FIG. 1.

A conventional flexible vacuum bag 32, which may comprise without limitation, nylon or polyester, covers the part layup 20 and is sealed to the tool surface 25 using conventional sealing tape or other sealing methods (not shown). Although not illustrated in the drawings, one or more breathers, peel plies, caul plates, etc. may be placed over the part layup 20 beneath the vacuum bag 32. The vacuum bag 32 includes an air outlet 38 coupled with vacuum tube 40 that is used to evacuate the bag 32, resulting in compaction pressure being applied to the part layup 20 during a cure cycle.

An electric charge generator 24, described later, is attached to the bottom side 36 of the tool 22. The electric charge generator 24 along with the tool 22 and the part layup 20 are supported on an oven rack 30 that may be placed within a conventional heating oven 26 to carry out curing. The electric charge generator 24 is electrically insulated from the oven rack 30 by an insulation layer 28, which may comprise, without limitation, a glass fabric. During charging of the tool by the electric charge generator 24, the insulation layer 28 electrically insulates the electric charge generator 24 from the oven rack 30, thus preventing discharge of the negative charges placed on the tool 22.

In the embodiment shown in FIGS. 2 and 3, the electric charge generator 24 comprises a triboelectric static charge generator that includes first and second layers 42, 44 respectively, of a first material, spaced apart and separated by pervious layer 46 of a second material that allows air to pass therethrough. The first and second layers 42, 44 respectively of the first material, have opposing surfaces 42a, 44a (FIG. 3) that are in contact with the layer 46 of the second material. The triboelectric charge generator 24 generates an electric charge by the triboelectric effect. The triboelectric effect, sometimes known as triboelectric charging, is a form of contact electrification in which certain materials become electrically charged after they come in contact with another different material, and are then separated, such as through rubbing, although charge transfer may occur in some cases through simple contact without rubbing or separation. The polarity and the strength of the charges produced differ according to the materials, surface roughness, temperature, strain and other properties of the materials. Materials may be arranged in a list, known as the triboelectric series, according to the order of a polarity of charge separation when they are touched by another object. A material towards the bottom of the series, when touched by a material near the top of the series, will attain a more negative charge, and vice versa. The further away materials are from each other on the triboelectric series, the greater the charge transferred.

The layers of material 42, 44, 46 are covered by a vacuum bag 56 which may comprise for example, and without limitation, polyester or nylon. The vacuum bag 56 is sealed to the bottom side 36 of the tool 22 by any suitable technique, such as use of a conventional sealing tape (not shown) and conformally engages one the second layer 44 of the second material. A Venturi device 52 attached to one side of the bag 56 is coupled with a suction tube 54. The Venturi device 52 includes an internal Venture tube (not shown) that produces a local partial vacuum within the bag 56. This local partial vacuum causes air to be drawn into an inlet 48 in the bag 56 and through the layer 46 of the second material.

The air flowing through the layer 46 of the second material moves across over the surfaces 42a, 44a (FIG. 3) of the first and second layers 42, 44 of the first material. The second material forming layer 46 and the first material forming the layers 42, 44, are chosen such that they are sufficiently spaced apart in the triboelectric series to generate the desired magnitude of negative charge on the tool 22 when air flows through the layer 46 and over the first and second layers 42, 44. For example, and without limitation, in one embodiment, each of the first and second layers 42, 44 of material may comprise a material that has a relatively negative charge in the triboelectric series, such as, without limitation, a suitable FEP (fluorinated ethylene propylene) such as Teflon®, and the layer 46 of the second material may comprise a woven glass/N10 having a relatively positive charge in the triboelectric series.

Contact of the bag 56 with second layer 44, along with air flow 50 over the opposing surfaces 42a, 44a of the first and second layers 42, 46 respectively result in a negative charge being placed on the tool 22 by a triboelectric charge generation effect. Other arrangements of materials may be employed on the backside 36 of the tool 22 in order to generate an electrostatic charge on tool 22 through a triboelectric effect. As previously discussed, the electric charge produced by the electric charge generator 24 negatively charges the tool 22. The negative charge on the tool surface 25 results in an electrostatic force F (FIG. 1) that attracts molecules (FIG. 3) of both the gases and the resin 58, 60 respectively, in direction 62 toward the tool surface 25, thereby substantially reducing or eliminating porosities in the cured part, particularly tool-side porosities. The migration of the resin molecules 60 toward the tool surface 25 caused by the electrostatic force F may aid in moving the gas molecules 58 out of the part layup 20 to the tool surface 25.

Figure 4A:
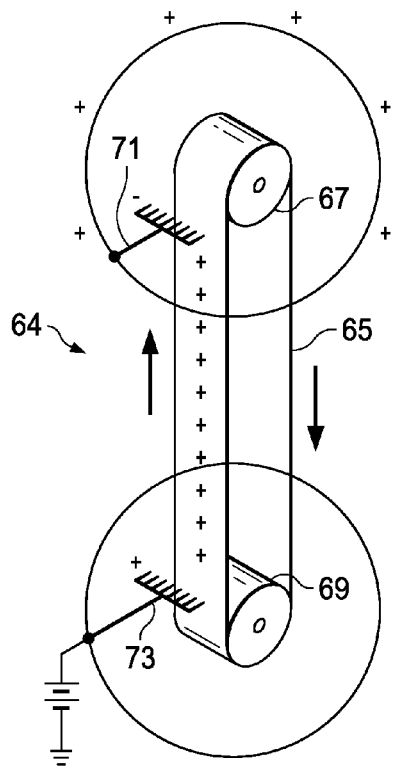
FIG. 4A is an illustration a diagrammatic view of a Van der Graaff generator employing the triboelectric effect.

As previously mentioned, the electric charge generator 24 shown in FIG. 1 may comprise any of a number of devices that are capable of generating an electric charge that may be transferred to the tool 22 in order to establish a negative electrostatic charge on the tool surface 25 and the desired potential difference between the tool 22 and the composite part layup 20. For example, referring to FIG. 4, the electric charge generator 24 may comprise a powered electrostatic charge generator 64 that may be directly connected to the tool 22. In this example, the tool 22 is supported on an oven rack 30 that is insulated from the tool 22 by a layer 28 of electrical insulation.

Electrostatic generator 64 may comprise, without limitation, a Van der Graaff generator comprising a belt (not shown) of flexible dielectric material running over two or more pulleys (not shown), and electrodes positioned near the pulleys (not shown). Alternatively, the electrostatic generator 64 may comprise a form of a Van der Graaff generator employing the triboelectric effect, such as that shown in FIG. 4A. In this latter example, the friction between one or more belts 65 and a pair of rollers 67, 69, one of them being made of insulating material, or both being made of insulating materials at different positions on the triboelectric scale, one above and the other below the material or the belt, charges the rollers 67, 69 with opposite polarities. An electric field (not shown) from the rollers 67, 69 then induces a corona discharge on electrodes 71, 73 which spray the charge onto the belts 65 which are opposite in polarity to the charge on the rollers 67, 69. Use of the powered type electrostatic generator 64 described above may be desirable in connection with cure tools 22 that have complex or highly contoured tool surfaces, and with both large and small tool strings.

A further embodiment of apparatus for curing a composite part layup 20 that reduces or eliminates part porosity is illustrated in FIG. 5. In this example, the bottom side 36 of the tool 22 is substantially covered by a layer of a first material 42. A layer 56 of a second material covers the layer 42 of the first material and is sandwiched between layer 42 and the insulating layer 28. The first and second layers of 42, 56 have inherent charges that are sufficiently different on the triboelectric scale to produce the desired static electric charge on the tool surface 25. For example, layer 42 contacting the bottom side 36 of the tool 22 may comprise an FEP/Teflon material having a relatively negative charge, and layer 56 may be comprise a nylon or polyester having a relatively positive charge on the triboelectric series. In the embodiment shown in FIG. 5, it is not necessary to pass air over either of the layers 42, 56 as is carried out in the embodiment shown in FIGS. 2 and 3.

Figure 6:
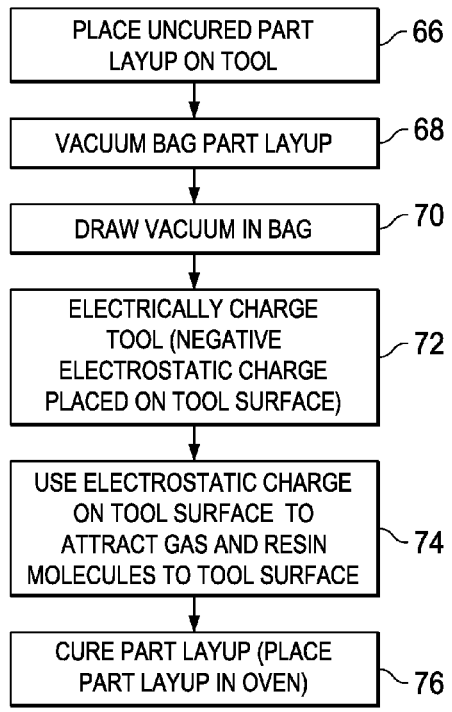
FIG. 6 is an illustration of a flow diagram of a method of curing a composite resin part layup that reduces part porosities.

Attention is now directed to FIG. 6 which broadly illustrates the overall steps of a method for curing a composite part layup that reduces tool side porosity in cured part, and which may be carried out using conventional vacuum bag processing techniques and a conventional curing oven. Beginning at 66, an uncured part layup 20 is placed on the surface 25 of a tool 22. At 68, a vacuum bag 32 is placed over the part layup 20 and sealed to the tool 22. At 70, a vacuum is drawn within the vacuum bag 32, and at 72, the tool 22 is electrically charged, which in the illustrated example comprises placing a negative charge on a tool 22, which results in a negative electrostatic charge on the tool surface 25. At 74, the electrostatic charge placed on the tool surface 25 is used to attract gas and resin molecules to the tool surface 25. At 76, the composite part layup is cured by placing the part layup 20 along with the negatively charged tool 22 in a conventional oven 26.

Embodiments of the disclosure may find use in a variety of potential applications, particularly in the transportation industry, including for example, aerospace, marine, automotive applications and other application where automated layup equipment may be used. Thus, referring now to FIGS. 7 and 8, embodiments of the disclosure may be used in the context of an aircraft manufacturing and service method 78 as shown in FIG. 7 and an aircraft 80 as shown in FIG. 8. Aircraft applications of the disclosed embodiments may include, for example, without limitation, curing of composite resin parts such as, without limitation beams, spars and stringers, to name only a few. During pre-production, exemplary method 78 may include specification and design of the aircraft 80 and material procurement 84. During production, component and subassembly manufacturing 86 and system integration 88 of the aircraft 80 takes place. Thereafter, the aircraft 80 may go through certification and delivery 90 in order to be placed in service 92. While in service by a customer, the aircraft 80 is scheduled for routine maintenance and service 94, which may also include modification, reconfiguration, refurbishment, and so on.

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 80 produced by exemplary method 78 may include an airframe 96 with a plurality of systems 98 and an interior 100. Examples of high-level systems 98 include one or more of a propulsion system 102, an electrical system 104, a hydraulic system 106, and an environmental system 108. Any number of other systems may be included. Although an aerospace example is shown, the principles of the disclosure may be applied to other industries, such as the marine and automotive industries.

Systems and methods embodied herein may be employed during any one or more of the stages of the production and service method 78. For example, components or subassemblies corresponding to production process 86 may be fabricated or manufactured in a manner similar to components or subassemblies produced while the aircraft 80 is in service. Also, one or more apparatus embodiments, method embodiments, or a combination thereof may be utilized during the production stages 86 and 88, for example, by substantially expediting assembly of or reducing the cost of an aircraft 80. Similarly, one or more of apparatus embodiments, method embodiments, or a combination thereof may be utilized while the aircraft 80 is in service, for example and without limitation, to maintenance and service 94.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of reducing porosities of a composite resin part, comprising:
   placing an uncured composite part layup on a surface of a tool; and
   attracting molecules within the uncured composite part layup to the surface of the tool, wherein attracting the molecules to the surface of the tool includes placing an electrical charge on the tool by electrically charging the tool.

2. The method of claim 1, further comprising curing the part layup.

3. The method of claim 1, wherein electrically charging the tool is performed using triboelectric charging.

4. The method of claim 1, wherein electrically charging the tool is performed using a Van der Graaff generator.

5. The method of claim 1, wherein electrically charging the tool is performed using a negative charge generator and the charge placed on the tool is a negative charge.

6. The method of claim 1, further comprising:
   using the electrical charge on the tool to attract molecules of gas in the composite part layup toward the surface of the tool.

7. The method of claim 1, wherein electrically charging the tool is performed using an electrostatic charge generator.

8. The method of claim 7, wherein charging the tool in includes:
   placing a layer of material in contact with the tool, and
   passing air over the surface of the layer of material.

9. The method of claim 1, wherein electrically charging the tool is performed by:
   placing a layer of FEP against the tool, and
   placing a material against the layer of FEP, wherein the material is one of nylon and polyester.

10. A method of fabricating a composite part, comprising:
    placing an uncured composite resin part layup on a surface of a tool;
    sealing a vacuum bag over the composite resin part layup;
    drawing a vacuum in the vacuum bag;
    heating the composite resin part layup; and
    placing an electric charge on the tool to attract gas molecules within the composite resin part layup toward the surface of the tool.

11. The method of claim 10, further comprising curing the composite part layup.

12. The method of claim 10, wherein placing the electric charge on the tool is performed by triboelectrical charging of the tool.

13. The method of claim 12, wherein the triboelectric charging is performed by placing a first layer of a first material in contact with the tool, wherein the first layer of the first material is relatively negative on a triboelectric series, and contacting the first layer of the first material with a second material, wherein the first and second materials are substantially spaced apart on the triboelectric series.

14. The method of claim 13, wherein contacting the first material with a second material includes passing air over the first material.

15. A method of reducing tool-side porosities in a composite resin part layup while being cured on a surface of a tool, comprising:
    using an electric charge to attract gas molecules in the composite resin part layup to the surface of the tool.

* * * * *